US010118651B2

(12) United States Patent
Dureiko et al.

(10) Patent No.: US 10,118,651 B2
(45) Date of Patent: Nov. 6, 2018

(54) INTERIOR BODY PANEL FIT AND FINISH TABS AND METHODS OF INSTALLATION AND USE THEREOF

(71) Applicant: HONDA MOTOR CO., LTD., Minato-ku, Tokyo (JP)

(72) Inventors: Alexander B Dureiko, Columbus, OH (US); Ryan M Stokes, Dublin, OH (US); Christopher D Hinz, Raymond, OH (US); Andrew Edward Barrow, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/042,056

(22) Filed: Feb. 11, 2016

(65) Prior Publication Data

US 2017/0233013 A1     Aug. 17, 2017

(51) Int. Cl.
*B62D 27/02* (2006.01)
*B60R 13/02* (2006.01)
*B60J 1/00* (2006.01)
*B62D 65/14* (2006.01)

(52) U.S. Cl.
CPC ........ *B62D 27/023* (2013.01); *B60R 13/0206* (2013.01); *B60R 13/0243* (2013.01); *B60J 1/00* (2013.01); *B62D 65/14* (2013.01)

(58) Field of Classification Search
CPC ......... B60J 1/2041; B60J 1/00; B62D 27/023; B62D 65/14; B60R 13/0206; B60R 13/0243
See application file for complete search history.

(56) References Cited

U.S. PATENT DOCUMENTS

| 2,387,317 A | 10/1945 | Cunnington |
| 4,398,984 A | 8/1983 | Uchiyama et al. |
| 4,728,143 A | 3/1988 | Tanino et al. |
| 4,882,842 A | 11/1989 | Basson et al. |
| 5,089,912 A * | 2/1992 | Simin ............. B60J 1/2041 160/370.22 |
| 5,111,619 A | 5/1992 | Billin et al. |
| 5,345,721 A | 9/1994 | Stein et al. |

(Continued)

FOREIGN PATENT DOCUMENTS

| FR | 2888547 A3 | 1/2007 |
| JP | S6349648 B2 | 10/1988 |
| WO | WO 9925567 A1 | 5/1999 |

*Primary Examiner* — D Glenn Dayoan
*Assistant Examiner* — Melissa A Black
(74) *Attorney, Agent, or Firm* — Arent Fox LLP

(57) ABSTRACT

Interior panel and body assembly features for vehicles that include the placement of panel tabs on vehicle interior panels, with the panel tabs on the interior panels having features for interactive attachment of the interior panels with vehicle body portions via corresponding body tabs on each vehicle body portion. The interactive attachment aspects of the panel tabs operating with the body tabs may further assist in properly locating each interior panel relative to a vehicle body portions. When the interior panel is installed on the vehicle body, each panel tab attaches the interior panel to the corresponding body portion via a body tab, so as to enhance the strength of the attachment, such as at an edge location where standard attachment clips cannot be used, thereby improving positioning and good fit and finish, while maximizing interior space capacity.

21 Claims, 10 Drawing Sheets

(56) References Cited

U.S. PATENT DOCUMENTS

| | | |
|---|---|---|
| 5,830,559 A | 11/1998 | Goldbach et al. |
| 5,947,547 A | 9/1999 | Deeks et al. |
| 6,123,385 A | 9/2000 | Bailey et al. |
| 6,381,906 B1 | 5/2002 | Pacella et al. |
| 7,401,840 B2 * | 7/2008 | Schnoblen ............ B60J 1/2044 160/370.22 |
| 7,971,923 B2 | 7/2011 | Mazur et al. |
| 8,663,535 B2 * | 3/2014 | Larcom ............... B60R 13/0243 264/319 |
| 2011/0215612 A1 | 9/2011 | Maertin et al. |

* cited by examiner

Related Art

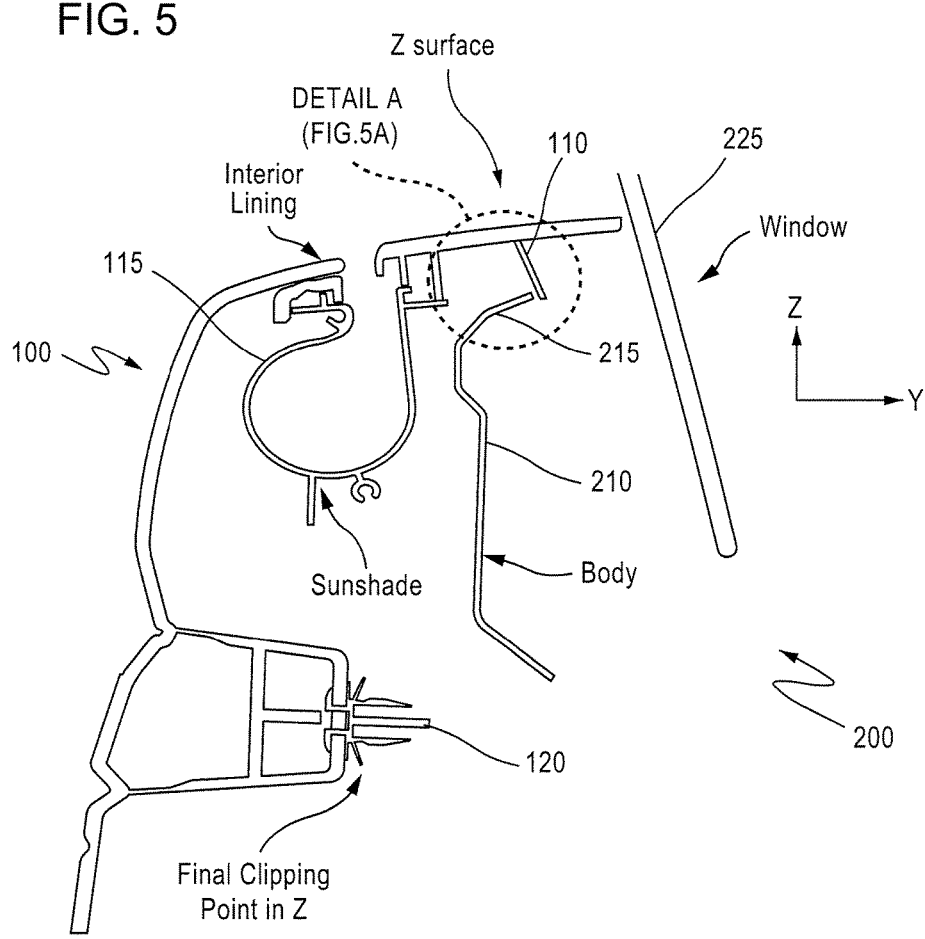

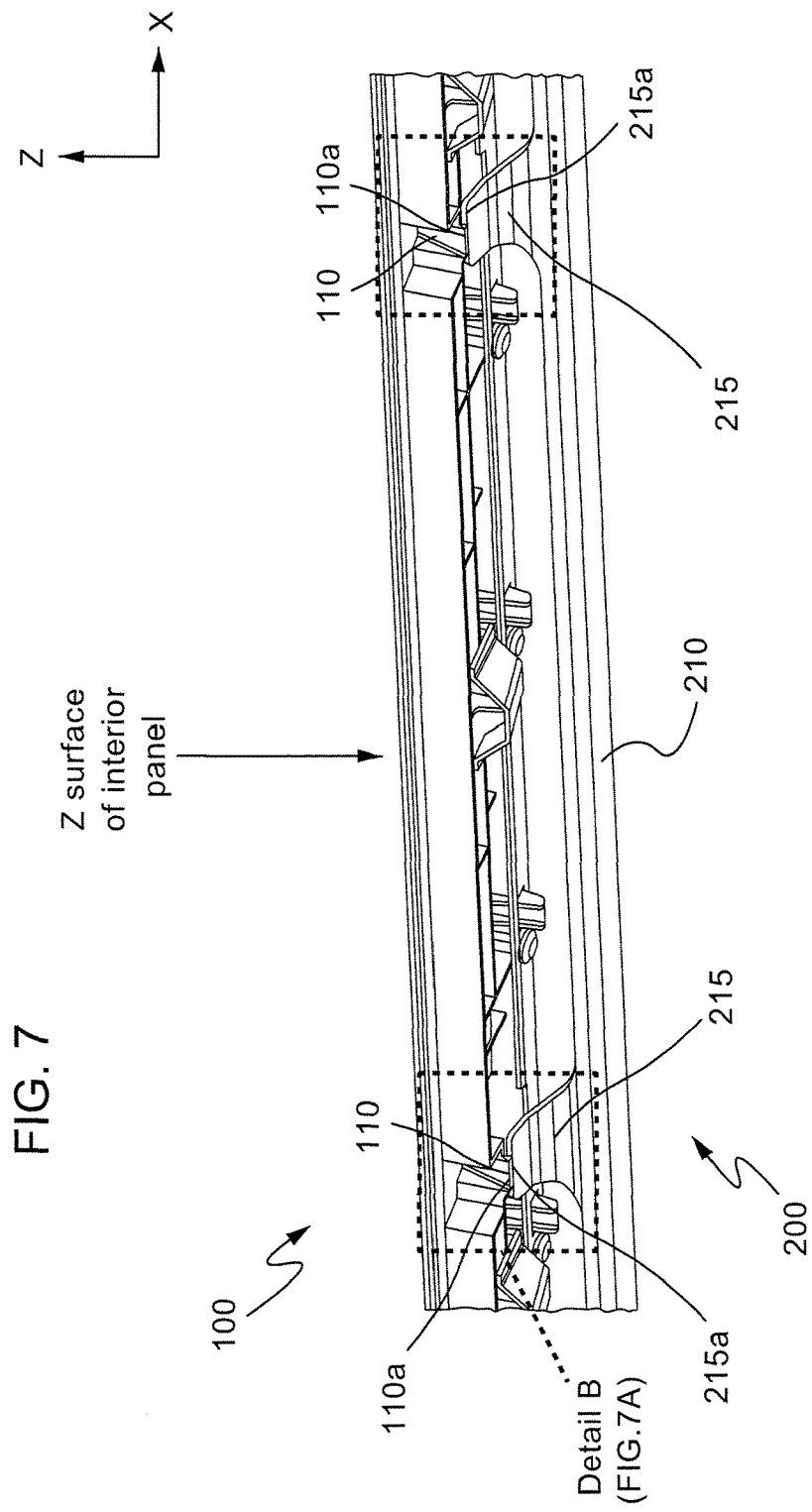

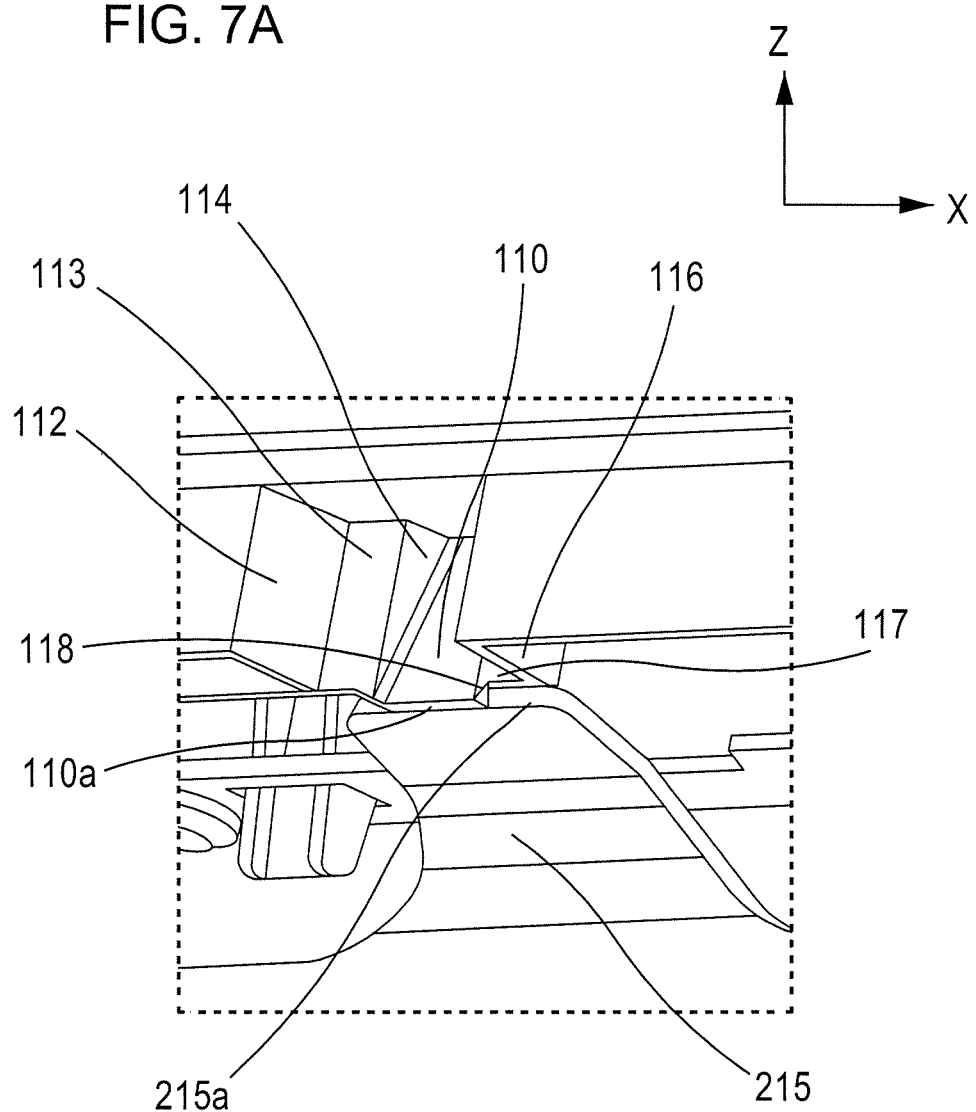

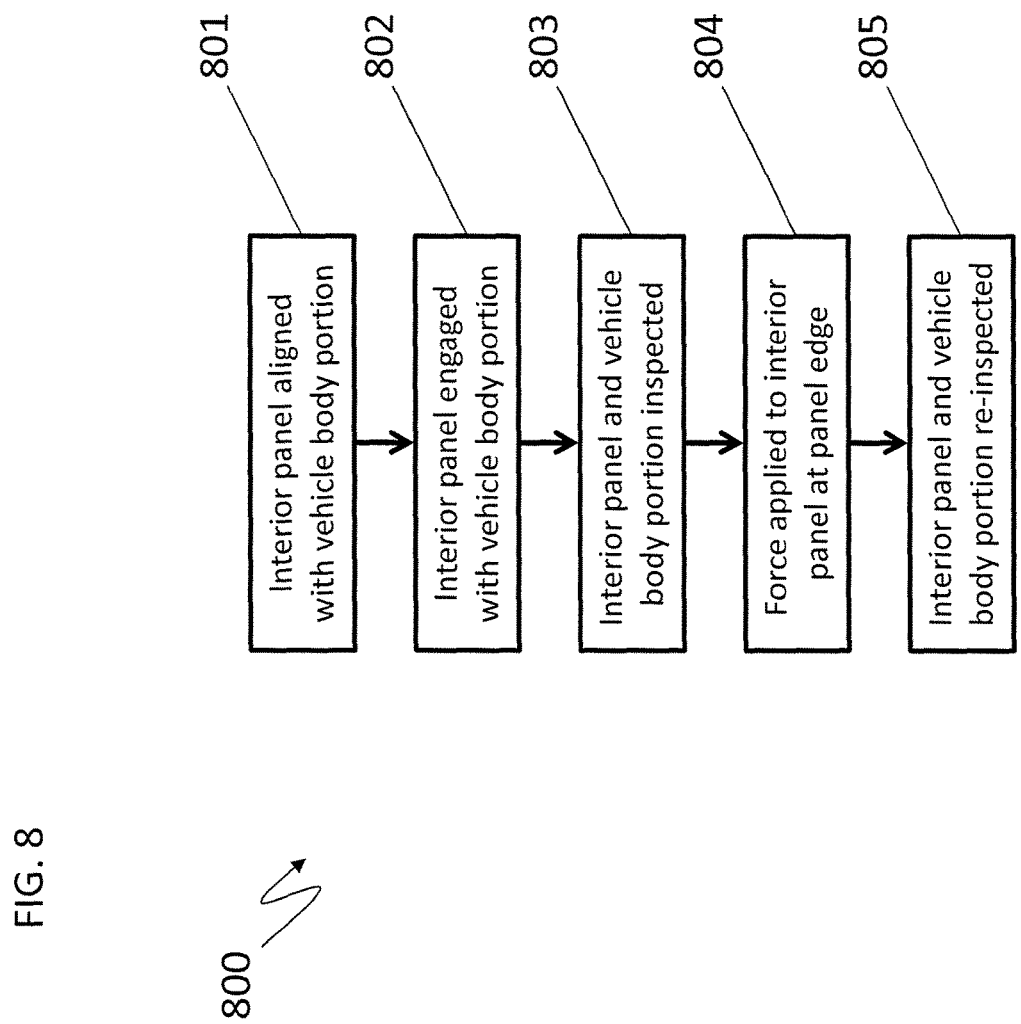

INTERIOR BODY PANEL FIT AND FINISH TABS AND METHODS OF INSTALLATION AND USE THEREOF

TECHNICAL FIELD

Aspects of the disclosure relate generally to the field of vehicle parts and assembly, and particularly to interior panel and body assembly features for vehicles, and installation and use thereof.

BACKGROUND

Related art interior panels for vehicles, such as automobiles, but also other vehicles, are typically installed using garnish clips. As used herein, an "interior panel" refers to a covering located within the interior of a vehicle and visible therewithin, such interior panel also being interchangeably referred to herein as an "interior lining." These garnish clips come attached on the interior panel itself and typically face the same direction to aid assembly of the vehicle.

Limited attachment space on the panel and/or body part may limit the number and locations available for known attachment clips and may lead to the undesirable formation of gaps, for example, between glass and abutting interior panels. Additionally, installation of the panel may occur without visually being able to identify all of the clip attachment points. With a large amount of clips being present on the panel, some clips may get crushed, rather than properly be engaged, or may not fully and properly be engaged with corresponding clip points.

FIG. 1 shows an example panel and FIG. 2 shows a cross-sectional view of the panel and a corresponding body portion to which the panel is attached, both in accordance with the related art. Some surfaces may flow along the Z plane (e.g., in a direction toward the vehicle roof, as shown in FIGS. 1 and 2) and X plane (e.g., the direction between the front and back of the vehicle, as shown in FIG. 1), not solely the Y plane (e.g., in the direction of connection between the interior panel and the vehicle body part, as shown in FIG. 2). However at least some known interior panel clips need to be placed in position so as to properly travel in the install direction, which is the Y direction as shown in FIG. 2. This leaves the top curved Z surface "floating" (see "Z surface" indicated in FIG. 2), in that no panel clips are located near this region. In this example, a sunshade, which is attached on the interior panel on the Z surface, adds additional weight to the interior panel and also interferes with the use of clips at higher locations on the interior panel (upwardly in the Z direction as indicated in FIG. 2; see also "blocked clip area" indicated in FIG. 2).

Related art interior panel assembly features are often specific just to vehicle door applications (which is typically inapplicable to addressing problems with non-door interior panel installation), for example, or in some cases, to other vehicle portions, but in a manner that does not fully address problems with such installation, and which may further give rise to other problems, such as requiring additional parts and/or welding of additional features, and/or failing to identify and/or address potential errors in assembly.

A system for attaching interior panels to vehicle body portions that provides support to a Z surface in at least the Z direction, without reducing space within the vehicle, and while maintaining manufacturability of the vehicle, is desired.

SUMMARY

Aspects of the present disclosure relate generally to the field of vehicle parts and assembly, and particularly to interior panel and body assembly features for vehicles, and installation and use thereof.

Aspects of the present disclosure include the placement of one or more tabs on vehicle interior panels (also interchangeably referred to herein as "inner panels"), with the tabs on the interior panels (such tabs also interchangeably being referred to herein as "fit and finish tabs," "panel tabs," "inner panel tabs," and/or "interior panel tabs") having features for interactive attachment of the interior panels with corresponding vehicle body portions via one or more corresponding tabs on each vehicle portion (such vehicle body portion tabs also interchangeably referred to herein as "body tabs"). The interactive attachment aspects of the interior panel tabs operating with the body tabs on the vehicle body portions (such interactive attachment of the interior panel tabs with the body tabs thereby enabling the interior panel tabs to be "assembleable" with the body tabs) may further assist in properly locating each interior panel relative to a vehicle body portion to which the interior panel is attached. On the vehicle body portion, aspects of the present disclosure relate to corresponding body tabs for engagement with the panel tabs. When the interior panel is installed on the vehicle body at the interior body portion location, for example, each panel tab attaches the interior panel to the corresponding body portion via a body tab, so as to enhance the strength of the securing of the interior panel to the body portion, for example, at an upper edge and/or other edge for which attachment clips cannot be used, thereby improving positioning and good fit and finish, while maximizing interior space capacity, among other advantages.

Aspects of the present disclosure also include a system for attaching interior panels to vehicle body portions and methods of assembly and installation thereof.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 shows a cross-sectional view of the example interior panel of FIG. 3 and the example body portion of FIG. 4 in an assembled arrangement, in accordance with aspects of the present disclosure.

FIG. 7 presents a perspective view, from a vantage point in the Y direction towards the interior of the vehicle, of panel tabs for the interior panel shown as engaged with corresponding body tabs of the body portion of FIG. 6, in accordance with aspects of the present disclosure.

FIG. 7A contains the close up of view of the area indicated as Detail B in FIG. 7.

FIG. 8 show an example flowchart for a method of installing an interior panel with a vehicle body portion, in accordance with aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure include the placement of one or more tabs on vehicle interior panels, with the panel tabs on the interior panels having features for interactive attachment of the interior panels with corresponding vehicle body portions via one or more corresponding body tabs on each vehicle body portion. The interactive attachment aspects of the panel tabs operating with the body tabs on the vehicle body portions may further assist in properly locating each interior panel relative to a vehicle body portions to which the interior panel is attached. On the vehicle body portion, aspects of the present disclosure relate to corresponding body tabs for engagement with the panel tabs. When the interior body panel is installed on the vehicle body at the interior body portion location, for example, each panel tab attaches the interior panel to the corresponding body portion via a body tab, so as to enhance the strength of the securing of the interior panel to the body portion, for example, at an upper edge and/or other edge for which attachment clips cannot be used, thereby improving positioning and fit and finish, while maximizing interior space capacity, among other advantages.

Figure 3:
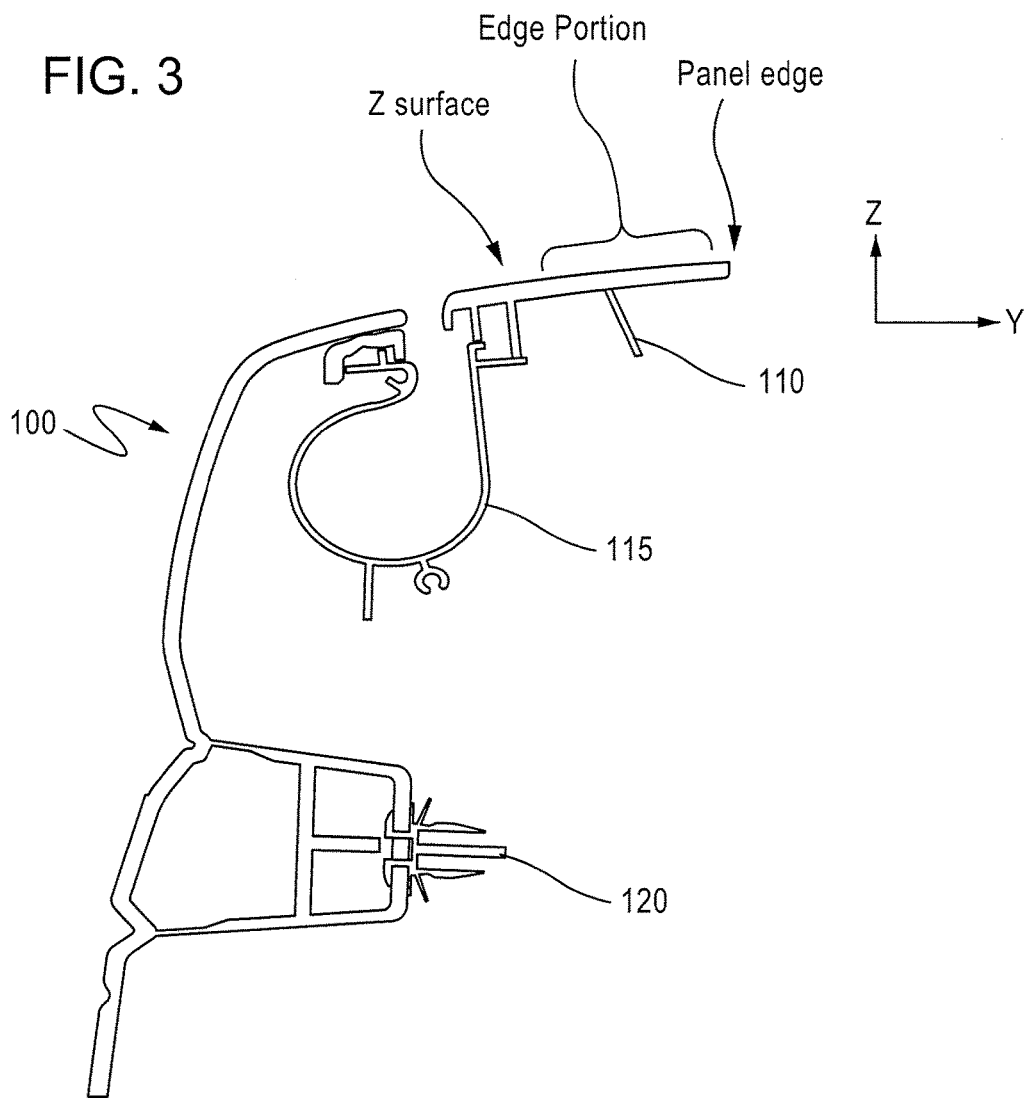
FIG. 3 shows a cross-sectional view of a portion of an example interior panel having one or more panel tabs, usable in accordance with aspects of the present disclosure.

FIG. 3 shows a cross-sectional view of a portion of an example interior panel 100 usable in accordance with aspects of the present disclosure. A cross sectional view of a portion of a panel tab 110 is shown in FIG. 3 as extending in a direction on an opposite side of the interior panel 100 from the indicated "Z surface" of the interior panel 100. In this example, the Z surface is located at least partially along an indicated edge portion of the interior panel 100 and the Z surface faces the vehicle interior upon installation. The panel tab 110 may be located along the indicated edge portion of the interior panel 100 by being, for example within about 2-10 inches of the indicated interior panel edge. In this example, a sunshade retaining portion 115 is coupled to, or included as a portion of, interior panel 100. Furthermore, an example clip 120 or other mechanical attachment feature for use in retaining the interior panel 100 relative to a body portion upon installation, is coupled to, or included as a portion of, interior panel 100. In this embodiment, clip 120 is used in addition to the panel tab 110 for retention.

Figure 4:
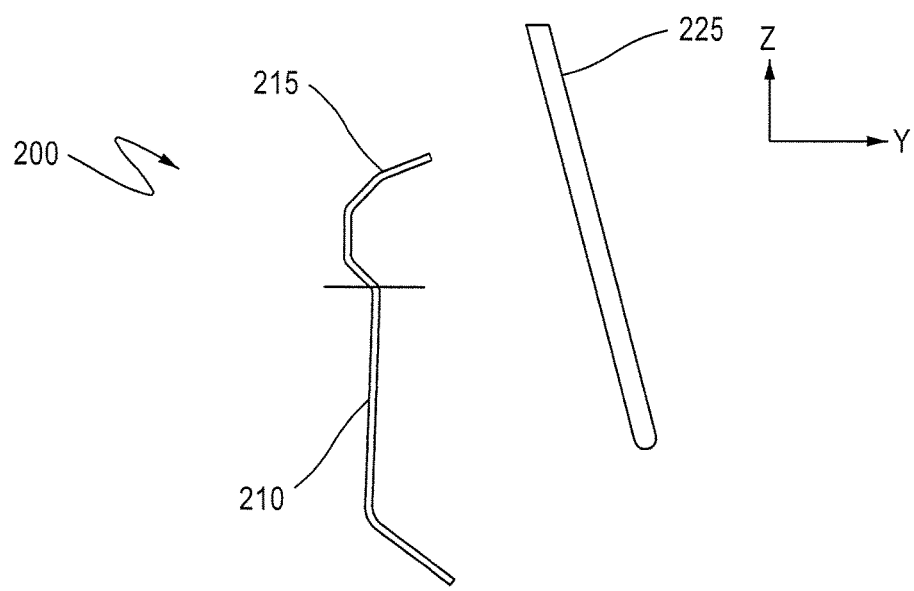
FIG. 4 contains a cross-sectional view of an example body portion of a vehicle to which the interior panel of FIG. 3 may be attached, including one or more body tabs, in accordance with aspects of the present disclosure.

FIG. 4 shows a cross-sectional view of an example body portion 200 of a vehicle to which the interior panel 100 of FIG. 3 may be attached. The body portion 200 includes a body inner wall 210, a body tab 215 extending from the body inner wall 210 (the body tab 215 extending from dashed line indicated for edge of body inner wall 210), a clip or other mechanical attachment receiving feature, such as an opening for receiving a clip, and another example body portion 225, such as a window portion.

FIG. 5 shows a cross-sectional view of the interior panel 100 and the body portion 200 in an assembled arrangement. As shown in FIG. 5, the panel tab 110 has been engaged with the body tab 215 in the assembled position. In addition, example clip 120 may engage the body portion 200 at another point.

Figure 5A:
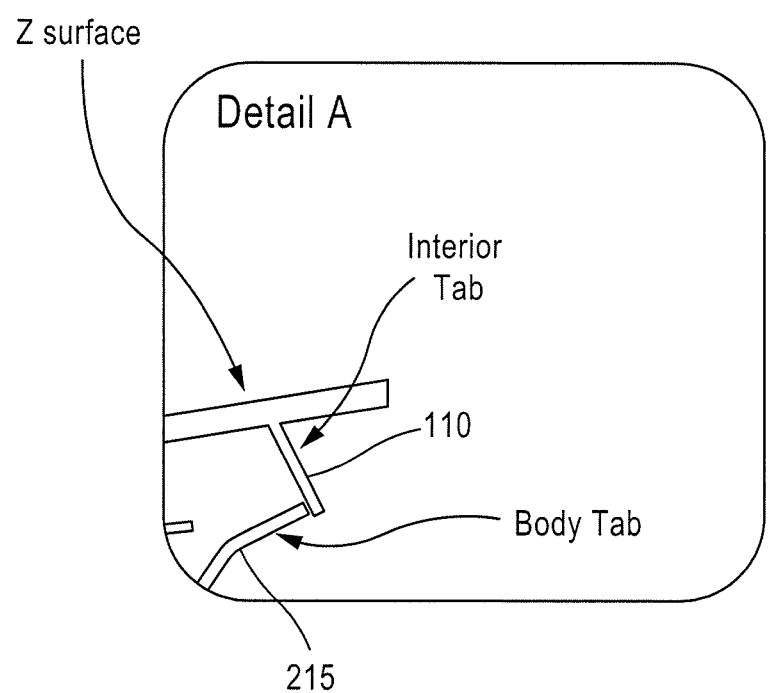
FIG. 5A shows a close up cross-sectional view of a panel tab engaged with a body tab, in accordance with the area indicated as Detail A in FIG. 5.

FIG. 5A shows a close up cross-sectional view of the panel tab 110 engaged with the body tab 215.

Figure 6:
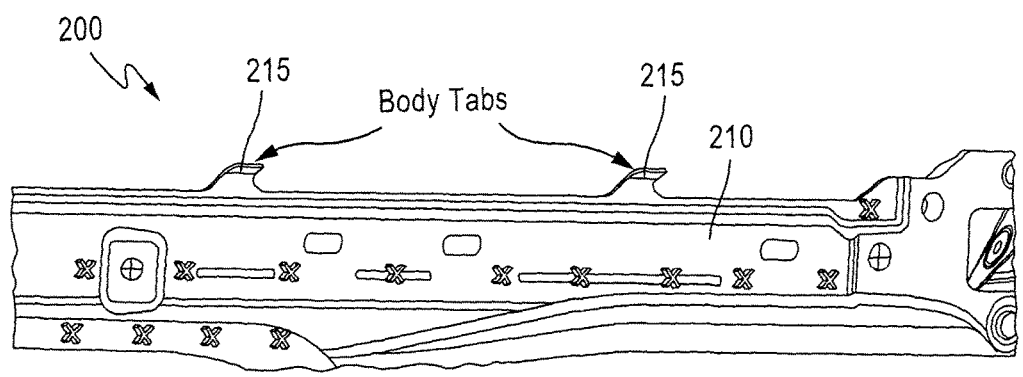
FIG. 6 shows a perspective view, from a vantage point in the Y direction towards the interior of a vehicle, of aspects of an example body portion having body tabs usable in accordance with aspects of the present invention.
Figure 6:
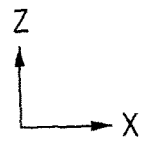

FIG. 6 shows a perspective view of example aspects of a body portion 200, which may be similar to the body portion 200 of FIG. 4. As shown in FIG. 6, the body portion 200 includes a body wall 210 and one or more body tabs 215 extending from the body inner wall 210. For example, the surface of the body wall visible in FIG. 6 may face toward the exterior of the vehicle, and the body tabs 215 may each curvably extend in a direction toward the exterior of the vehicle (e.g., out of the paper in the Y direction as shown in FIG. 6). Each body tab 215 may be formed, molded, or cut, for example, from the same body component/material as is used to form, cut, or mold the body wall 210 (e.g., steel; aluminum; composite; or another vehicle body material). The body tab 215 may alternatively be welded or attached to the body wall 210, for example, via screws, bolts, pins, an adhesive, and/or any other fastener that allows the body tabs 215 to function as described herein.

FIG. 7 presents a perspective view, from a vantage point in the Y direction towards the interior of the vehicle, of panel tabs 110 for the interior panel 100 shown as engaged with corresponding body tabs 215 of the body portion 200 of FIG. 6, in accordance with aspects of the present disclosure. In this example, each body tab 215 at its end 215a is shown as abuttably engaging an extending tab portion 110a of a corresponding panel tab 110, so as to assist in retaining the interior panel 100 relative to the body portion 200.

During assembly, in accordance with aspects of the present invention, for example, the interior panel 100, which may be relatively large (e.g., covering the rear interior quarter of a vehicle behind a door), may first be located relative to the vehicle body portion 200, such as by aligning edges of the interior panel 100 with identified corresponding locations of the vehicle body (e.g., right, left, and bottom edges of the interior panel 100 relative to the rear edge, front edge, and door jam of the vehicle body). The interior panel 100 may then be pressed or otherwise engaged into place, such as by applying force at points on the interior facing of the interior panel 100 near locations oppositely corresponding to clips to be engaged with the vehicle body. After engagement of these clips, for example, the Z surface of the interior panel 100 may show a visible gap with the window 225 to which it is to align. Force may then be applied at points towards the Z direction end of the interior panel 100, so as to "snap" the panel tabs 110 past the body tabs 215 (assuming the panel tabs 110 and body tabs 215 are properly aligned; if not, the failure of this engagement will reveal a misalignment or other installation problem), and to thereby properly secure this portion of the interior panel 100 to the body portion 200.

As shown in FIG. 8, assembly may include the following method 800. The interior panel may be aligned with corresponding locations on the vehicle body 801, such as relative to a body portion to which the interior panel is to be installed. The interior panel may then be engaged with the vehicle body portion 802, such as by engaging one or more clips, for example, located on the side of the interior panel facing the body portion, the body portion having a corresponding clip receiving opening. After engagement of the interior panel with the body portion 802, the interior panel and body portion may be visually inspected 803, for example, to identify an edge gap (e.g., a gap at the Z edge) therebetween and to confirm the alignment of panel tabs and body tabs. A force may then be applied to the interior panel to engage each of the panel tabs with the body tabs 804. The interior panel and the body portion may then optionally be visually re-inspected 805 to confirm that the edge gap has been appropriately closed.

In the example of FIG. 7, each panel tab 110 may include, for example, an integrated subsection that supports the extending tab portion 110a. For example, as shown in FIG. 7A, which contains the closeup of box Detail B (from FIG. 7), the panel tab 110 of the interior panel 100 may be supported by inset wall portions 112, 113, 114, 116, 117, 118 and/or other similar strengthening shaped regions of interior panel 100. Alternatively, for example, each panel tab 110 may be supported by other supporting features, such as attached brackets, arms, or other supports. Such brackets, aims, or other supports may be attached to the interior panel 100, for example, via screws, adhesives, or other similar mechanisms or formed, molded, or shaped, for example, with the interior panel 100 and panel tab 110. Advantages of the panel tabs 110 being formed integrally with the interior panel 100 over use of brackets and other supports include reduced part count and potentially reduced weight and/or cost.

The shape, size, and nature and amount of support features may be varied, for example, based on the size of the interior panel 100, the number of panel tabs 110, the material of construction, the calculated weight and or other impacts that may be made upon the interior panel 100, as well as other factors relating to the amount of securing strength that is appropriate for the particular features (e.g., weight, size, other physical characteristics, such as shaped areas) of interior panel 100, the calculated weight and effects of impacts that may be made upon the interior panel 100 (and thus potentially correspondingly affecting the panel tabs 110), as well as other factors relating to the amount of securing strength that is appropriate. If the interior panel 100 comprises plastic or composite, for example, the panel tabs 100 may likewise be formed of plastic or a composite during the manufacture of the interior panel 100. One benefit of using materials such as plastics or composites for the panel tabs 110 is to reduce squeak and noise from contact of the panel tabs 110 with the body tabs 215, which may, for example, comprise a metal.

The shape, size, and other features of each body tab 215 may also be varied, for example, as appropriate for the features (e.g., weight, size, other physical characteristics, such as shaped areas) of the interior panel 100, the number of body tabs 215, the calculated weight and or other impacts that may be made upon the interior panel 100 (and thus potentially correspondingly affecting the body tabs 215, as well as other factors relating to the amount of securing strength that is appropriate. Note also that, as shown for example in FIG. 7A, both the panel tabs 110 and the body tabs 215 have a width in the X direction, as shown in FIG. 7A, such that the engagement point may vary slightly along the width of the overall overlap between the engaged panel tab 110 and body tab 215, thereby allowing some flex or "float" in assembly and/or flexing/impact that may occur with use.

Among other things, the body tabs (e.g., on the steel body) may help hold the interior panel's Z surface so as to reduce or prevent sag in the Y direction over time. With regard to assembly, one benefit is that use of the panel and body tabs enables a visual confirmation as to alignment and proper engagement of the panel tabs with the body tabs. For example, when the interior panel is installed, the Z surface will noticeably have a large offset in the Z and/or Y directions if the panel tabs and the body tabs have not properly engaged. Among other things, this visual indication assists in quickly identifying whether or not the interior panel has been attached correctly.

In addition, from a customer use viewpoint, for example, the use of the panel tabs and body tabs approach to attaching the interior panels in accordance with the present disclosure may result in a more robust attachment than the related art and has other advantages. A vehicle occupant, for example, may be able to pull the sunshade up and down without flexing the interior panel significantly in the Y direction. The panel tabs and the body tabs operating together may prevent the surface of the interior panel from sagging (e.g., in the Y and Z directions), or reduce sagging relative to the related art, due to heat and other factors over time. If an occupant pulls on the interior panel at this area, for example, the interior panel will only flex so as to produce a small gap between the panel and body tabs on the interior panel and body portions, respectively. Among other benefits, this approach adds to overall longer lasting and good fit and finish for the interior panel relative to the vehicle body.

Figure 1:
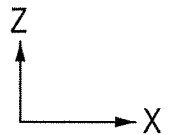
FIG. 1 shows an example door panel viewed from the vehicle interior and coupled to a vehicle body part, in accordance with related art.
Figure 1:
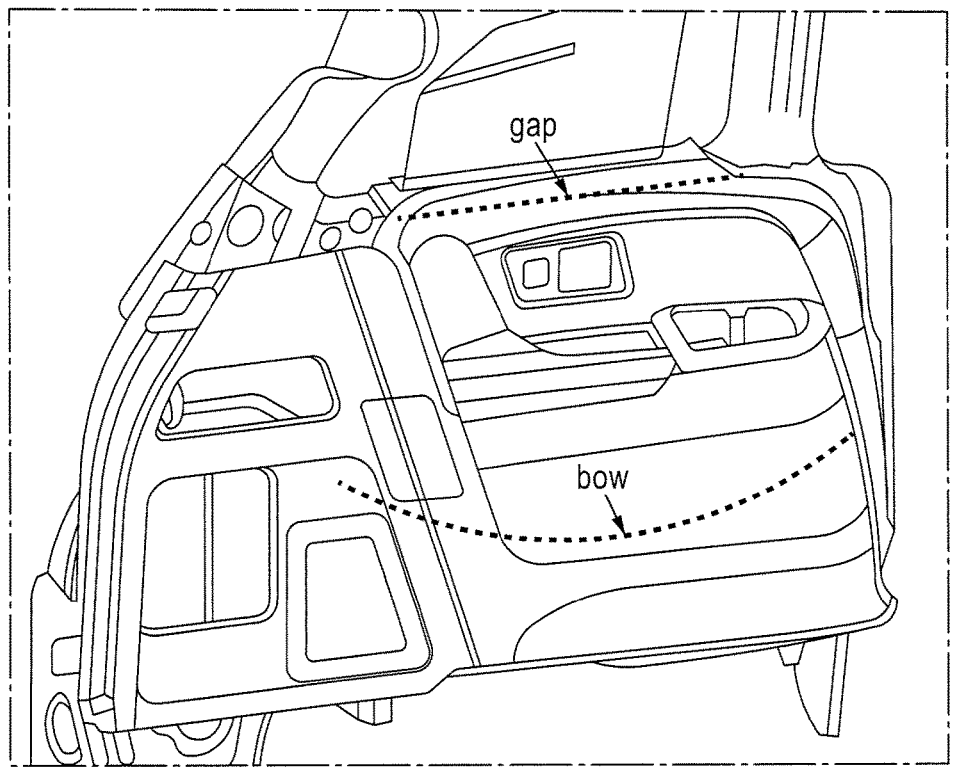
Figure 2:
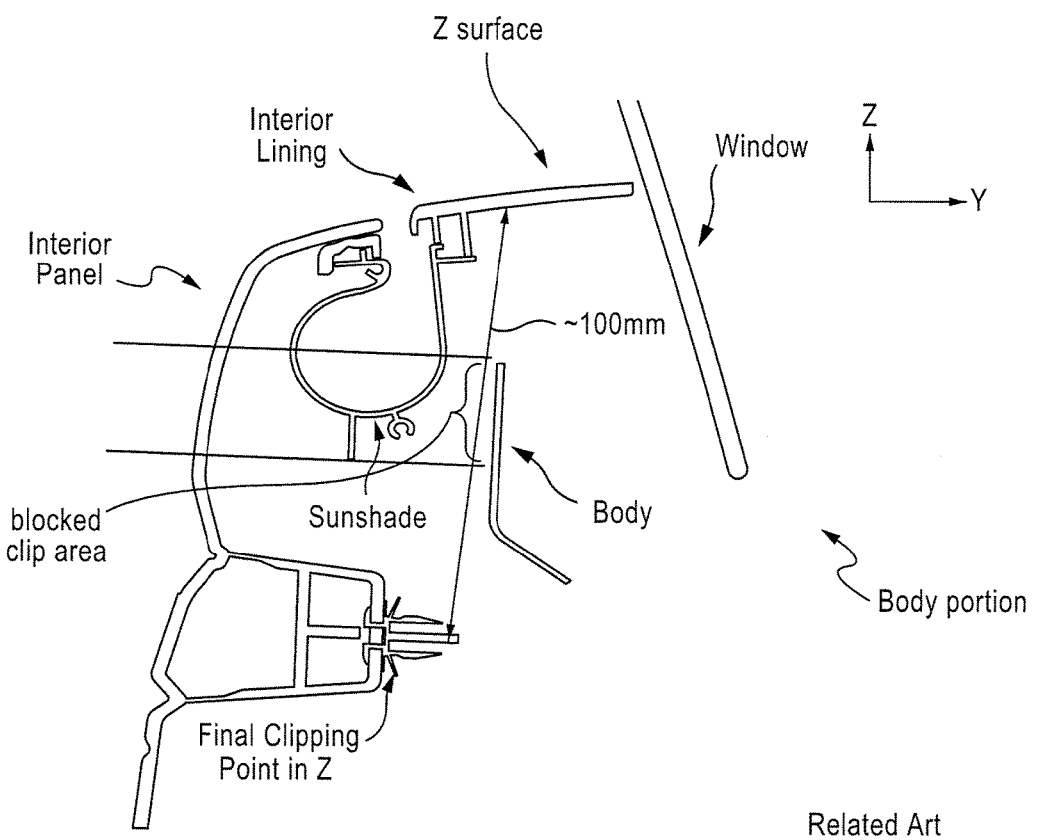
FIG. 2 shows a cross-sectional view of a panel and a corresponding body portion to which the panel is attached, in accordance with the related art.

Further benefits may include overall savings in cost, weight, and packaging, as well as reductions in parts count. For example, if the interior panel had clips at the highest point of the interior panel were used in accordance with the related art as shown in FIG. 2, more material would likely be required on the body side for mounting and on the interior side for accommodating a clip of the related art (e.g., the body panel shown in FIG. 2 would need to be extended opposite the Z surface for engagement of another clipping point near the Z surface). The approach of the related art would therefore add cost and also more weight to the vehicle than an approach in accordance with aspects of the present disclosure. Further, with the related art approach of FIG. 2, the addition of the clips behind or near the sun shade would only be achievable if the interior panel were to increase its depth in the Y direction, in order to accommodate both the related area clip housing (also interchangeably referred to herein as the clip "doghouse"), the clip itself, and sun shade area, thus resulting in less overall interior volume compared to an approach in accordance with aspects of the present disclosure.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure.

Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. An interior panel assembleable with a corresponding vehicle body portion, the interior panel comprising:
    a panel body having a vehicle interior facing surface and an edge portion;
    a sunshade retaining portion coupled to the panel body; and
    at least one panel tab extending from the panel body within the edge portion of the panel body on a side opposite the vehicle interior facing surface, each of the at least one panel tab having an extending length and a width, wherein each panel tab is positioned so as to lockably engage a corresponding one of at least one body tab extending from the vehicle body portion.

2. The interior panel of claim 1, wherein the vehicle body portion includes a body portion surface, and wherein each of the at least one body tab extends from the body portion surface.

3. The interior panel of claim 1, wherein each panel tab has an end edge;
    wherein each body tab has an extending length and a width, an end edge, and a curved surface portion, the curved surface portion extending in a direction towards the end edge, the curved portion being convex on a side of the body tab opposite a side facing the panel body; and
    wherein the end edge of each panel tab is configured to slidably pass along the curved portion of one of the at least one body tab, and to pass the end edge of the body tab when lockably engaged.

4. The interior panel of claim 1, wherein the edge portion of the panel body abuts a window of the vehicle.

5. The interior panel of claim 1, wherein each body tab has a body tab width, and wherein each panel tab is configured to lockably engage the one of the at least one body tab only when the panel tab is aligned along its panel tab width with the corresponding one of the at least one body tab along its body tab width.

6. The interior panel of claim 1, wherein the vehicle is an automobile.

7. An interior panel and body assembly, comprising:
    an interior panel body having a vehicle interior facing surface and a panel edge portion, the panel body having at least one panel tab extending from the panel body at the panel edge portion on a side opposite the vehicle interior facing surface, each of the at least one panel tab having an extending length and a width;
    a sunshade retaining portion coupled to the interior panel body; and
    a vehicle body portion having a vehicle interior facing surface, a body portion edge, and at least one body tab extending from the body edge portion;
    wherein each panel tab is positioned so as to lockably engage a corresponding one of the at least one body tab.

8. The interior panel and body assembly of claim 7, wherein the vehicle body portion includes a body portion surface, and wherein each of the at least one body tab extends from the body portion surface.

9. The interior panel and body assembly of claim 7, wherein each panel tab has an end edge;
    wherein each body tab has an extending length and a width, an end edge, and a curved surface portion, the curved surface portion extending in a direction towards the end edge, the curved portion being convex on a side facing the interior panel and convex on a side of the body tab on a side opposite the side facing the panel body; and
    wherein the end edge of each panel tab is configured to slidably pass along the convex curved portion of one of the at least one body tab, and to pass the end edge of the body tab when lockably engaged.

10. The interior panel and body assembly of claim 7, wherein the edge portion of the panel body abuts a window of the vehicle.

11. The interior panel and body assembly of claim 7, wherein each body tab has a body tab width, and wherein each panel tab is configured to lockably engage one of the at least one body tab only when the panel tab is aligned along its panel tab width with the corresponding one of the at least one body tab along its body tab width.

12. The interior panel and body assembly of claim 7, wherein the vehicle is an automobile.

13. A method for assembling an interior panel with a body portion of a vehicle, the method comprising:
    aligning the interior panel with the vehicle body portion;
    wherein the interior panel includes a panel body, a vehicle interior facing surface, a vehicle exterior facing surface, an edge portion, at least one panel tab extending from the panel body at the edge portion, and at least one attachment clip extending from the vehicle exterior facing surface, wherein the interior panel has a sunshade retaining portion coupled thereto, and wherein the at least one attachment clip is located other than at the edge portion; and wherein the vehicle body portion has at least one clip receiving feature and at least one body tab extending from the vehicle body portion;

engaging at least one attachment clip of the interior panel with the at least one clip receiving feature of the vehicle body portion; and applying a force to the interior panel at the edge portion to engage each of the at least one panel tab with each of the at least one body tab.

14. The method of claim 13, further comprising:

inspecting the interior panel and the vehicle body portion at the interior panel edge portion prior to applying force to the interior panel at the edge portion.

15. The method of claim 13, further comprising:

inspecting the interior panel and the vehicle body portion at the interior panel edge portion after applying force to the interior panel at the edge portion.

16. The method of claim 13, wherein the vehicle body portion includes a body portion surface, and wherein each of the at least one body tab extends from the body portion surface.

17. The method of claim 13, wherein each of the at least one panel tab has an extending length and a width and an end edge;

wherein each body tab has an extending length and a width, an end edge, and a curved surface portion, the curved surface portion extending in a direction towards the end edge, the curved portion being convex on a side of the body tab opposite a side facing the panel body; and wherein the end edge of each panel tab is configured to slidably pass along the curved portion of one of the at least one body tab, and to pass the end edge of the body tab when lockably engaged.

18. The method of claim 13, wherein the edge portion of the panel body abuts a window of the vehicle.

19. The method of claim 13, wherein each of the at least one panel tab has a width; and wherein each body tab has a body tab width, and wherein each panel tab is configured to lockably engage the one of the at least one body tab only when the panel tab is aligned along its panel tab width with the corresponding one of the at least one body tab along its body tab width.

20. The method of claim 13, wherein the vehicle is an automobile.

21. The interior panel of claim 1, wherein each of the at least one panel tab lockably engages with the corresponding one of the at least one body tab via a snap-fit.

\* \* \* \* \*